(12) United States Patent
Gagnon

(10) Patent No.: US 8,198,762 B2
(45) Date of Patent: Jun. 12, 2012

(54) WINDING END TURN COOLING IN AN ELECTRIC MACHINE

(75) Inventor: Gilles D. Gagnon, Brampton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 448 days.

(21) Appl. No.: 12/023,113

(22) Filed: Jan. 31, 2008

(65) Prior Publication Data
US 2009/0195092 A1 Aug. 6, 2009

(51) Int. Cl.
*H02K 9/00* (2006.01)
*H02K 9/20* (2006.01)
(52) U.S. Cl. .......................................... 310/54; 310/65
(58) Field of Classification Search ............... 310/52–65
See application file for complete search history.

(56) References Cited

U.S. PATENT DOCUMENTS

| | | | | | |
|---|---|---|---|---|---|
| 516,794 | A | * | 3/1894 | Bell | 310/64 |
| 2,793,506 | A | * | 5/1957 | Moody | 62/505 |
| 2,821,641 | A | * | 1/1958 | Ringland | 310/213 |
| 3,122,668 | A | * | 2/1964 | Cuny | 310/53 |
| 3,445,706 | A | * | 5/1969 | Drabik | 310/270 |
| 3,585,276 | A | * | 6/1971 | Beckett | 174/138 E |
| 3,663,127 | A | * | 5/1972 | Cheers | 417/372 |
| 3,675,056 | A | * | 7/1972 | Lenz | 310/54 |
| 4,274,021 | A | * | 6/1981 | Kamiya et al. | 310/54 |
| 4,565,503 | A | * | 1/1986 | Wise | 417/372 |
| 4,753,284 | A | * | 6/1988 | Krause et al. | 165/11.1 |
| 4,959,569 | A | * | 9/1990 | Snuttjer et al. | 310/53 |
| 5,363,002 | A | * | 11/1994 | Hernden et al. | 310/54 |
| 5,488,837 | A | * | 2/1996 | Sekino et al. | 62/244 |
| 5,644,179 | A | * | 7/1997 | Staub et al. | 310/65 |
| 5,703,421 | A | | 12/1997 | Durkin | |
| 5,955,810 | A | * | 9/1999 | Umeda et al. | 310/208 |
| 6,204,580 | B1 | * | 3/2001 | Kazmierczak | 310/52 |
| 6,252,318 | B1 | * | 6/2001 | Kazmierczak | 310/61 |
| 6,441,527 | B1 | * | 8/2002 | Taji et al. | 310/201 |
| 6,465,917 | B2 | | 10/2002 | Wetzel et al. | |
| 6,628,020 | B1 | * | 9/2003 | Tong | 310/61 |
| 6,639,334 | B2 | * | 10/2003 | Chen et al. | 310/52 |
| 6,815,848 | B1 | * | 11/2004 | Glew | 310/52 |
| 6,965,183 | B2 | | 11/2005 | Dooley | |
| 7,262,539 | B2 | | 8/2007 | Dooley | |
| 7,476,994 | B2 | | 1/2009 | Birdi et al. | |
| 7,482,725 | B2 | | 1/2009 | Down et al. | |
| 2003/0102728 | A1 | * | 6/2003 | Chen et al. | 310/52 |
| 2003/0168920 | A1 | * | 9/2003 | Baer et al. | 310/58 |
| 2003/0173839 | A1 | * | 9/2003 | Torii et al. | 310/52 |
| 2004/0070291 | A1 | * | 4/2004 | Chan et al. | 310/64 |
| 2004/0084976 | A1 | * | 5/2004 | Thiot | 310/58 |
| 2007/0152518 | A1 | * | 7/2007 | Perrin | 310/54 |
| 2007/0252450 | A1 | | 11/2007 | Dooley et al. | |
| 2007/0252473 | A1 | * | 11/2007 | Taniyama et al. | 310/270 |
| 2007/0262662 | A1 | | 11/2007 | Dooley et al. | |
| 2007/0268023 | A1 | | 11/2007 | Dooley | |
| 2008/0309176 | A1 | | 12/2008 | Dawson et al. | |

FOREIGN PATENT DOCUMENTS
GB 2386259 9/2003

* cited by examiner

*Primary Examiner* — Quyen Leung
*Assistant Examiner* — Alex W Mok
(74) *Attorney, Agent, or Firm* — Norton Rose Canada LLP

(57) ABSTRACT

Winding end turns in an electric machine are cooled by a coolant. Cooling is improved by redirecting the coolant generally tangentially through the winding end turns to improve heat transfer between coolant and windings.

12 Claims, 7 Drawing Sheets

US 8,198,762 B2

WINDING END TURN COOLING IN AN ELECTRIC MACHINE

TECHNICAL FIELD

The technical field generally relates to the cooling of windings in an electric machine.

BACKGROUND

In an electric machine, it may be required to circulate a coolant around the windings of the machine in order to remove heat resulting from the passage of an electric current therein. As the coolant circulates around the windings, heat is removed and the coolant is then sent through a heat exchanger before being recycled back to the windings.

Because of the usually complex internal configuration of electric machines, it may be difficult to circulate a coolant around winding end turns and obtain an optimum coolant distribution. Each winding end turn may comprise, for instance, a multitude of conductors. Depending on the design of the machine, the coolant tends to simply follow a path of least resistance outside the winding end turns and does not result in optimal cooling.

Therefore, room for improvements exists in the cooling of winding end turns in an electric machine.

SUMMARY

In one aspect, the present concept provides a cooling apparatus for an electric machine having a plurality of winding end turns that are generally axisymmetric with respect to one another, the apparatus comprising: a plurality of coolant input paths, each communicating with a source of coolant and defined between a corresponding pair of the winding end turns; a plurality of internal coolant paths defined tangentially relative to the machine, each coolant input path substantially extending through a corresponding one of the winding end turns and communicating with a corresponding one of the coolant input paths; and a plurality of coolant output paths, each communicating with a corresponding pair of the internal coolant paths.

In another aspect, the present concept provides an apparatus for cooling radially-disposed winding end turns of an electric machine, the apparatus comprising: means for distributing coolant between pairs of adjacently-disposed winding end turns formed by the winding end turns of the machine; means for directing the coolant from between the pairs of winding end turns tangentially relative to a center of the machine through the corresponding winding end turns of each pair; and means for redirecting the tangential flow of coolant exiting the winding end turns to an outlet.

In a further aspect, the present concept provides a method of circulating a coolant in an electric machine, the method comprising the continuous steps of: (a) providing a coolant flow into a first set of interspaces defined between adjacent winding end turns in the machine; (b) dividing the coolant flow into at least two branches, two said branches of the coolant flow being directed tangentially relative to the machine through one of the adjacent winding end turns; and (c) collecting the coolant branches exiting said adjacent winding end turns in a second set of the interspaces defined by the winding end turns.

Further details of these and other aspects of the present invention will be apparent from the detailed description and figures included below.

DESCRIPTION OF THE FIGURES

Reference is now made to the accompanying figures depicting aspects of the improved configuration and method, in which.

DETAILED DESCRIPTION

Figure 1:
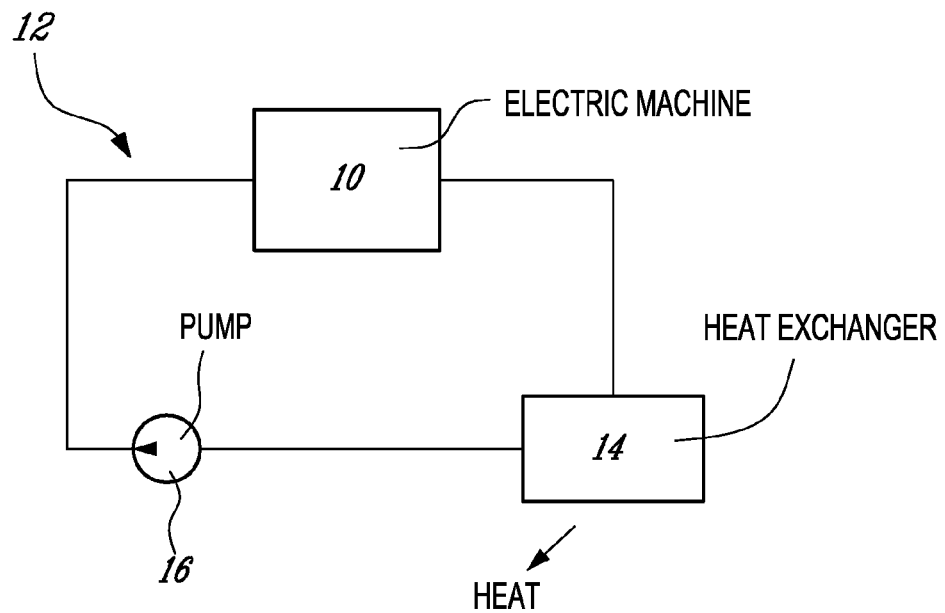
FIG. 1 is a schematic view of an example of a generic cooling system of an electric machine.

FIG. 1 illustrates an example of a generic cooling apparatus 12 for an electric machine 10. The coolant in this example is a liquid, for instance oil, which is circulated inside the electric machine 10 using a network of channels and passages disposed therein. The coolant removes heat from the machine 10, which heat generally results from an electric current circulating in a conductor. The coolant exits the electric machine 10 through an outlet at a higher temperature than when it came through the inlet of the electric machine 10. The heated coolant is sent to a heat exchanger 14, which removes the heat from the coolant. The coolant exits the heat exchanger 14 at a lower temperature than its temperature at the inlet thereof. A pump 16 pushes the coolant back into the electric machine 10 and a new cycle begins. It should be noted that FIG. 1 is schematic in nature, and many routine details have not been shown, for instance oil filters, valves, etc.

Figure 2:
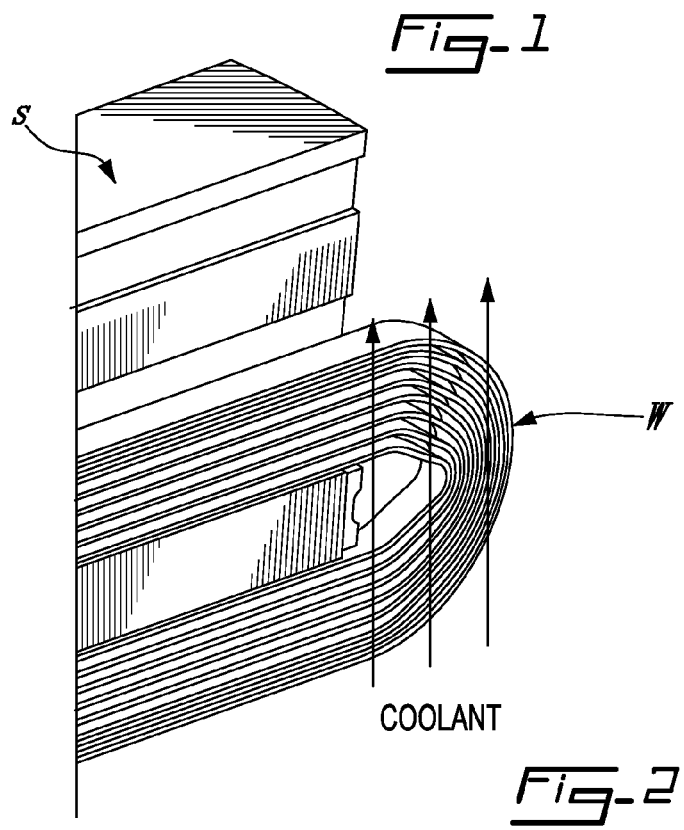
FIG. 2 is an enlarged isometric view of an example of one end turn of a winding of an electric machine.

FIG. 2 illustrates an example of a winding end turn W located in an electric machine. A plurality of winding end turns of this type are provided in the stator S of the machine. The winding end turn W and the coolant are confined in a casing (not shown) fitting over the side of the stator S. The coolant in the example circulates radially outwards with reference to the center of the machine. The path of least resistance being on the side of the winding end turn, the coolant tends not to pass through gaps provided between the end turn layers, which results in less than optimal cooling for a given coolant flow.

Figure 3:
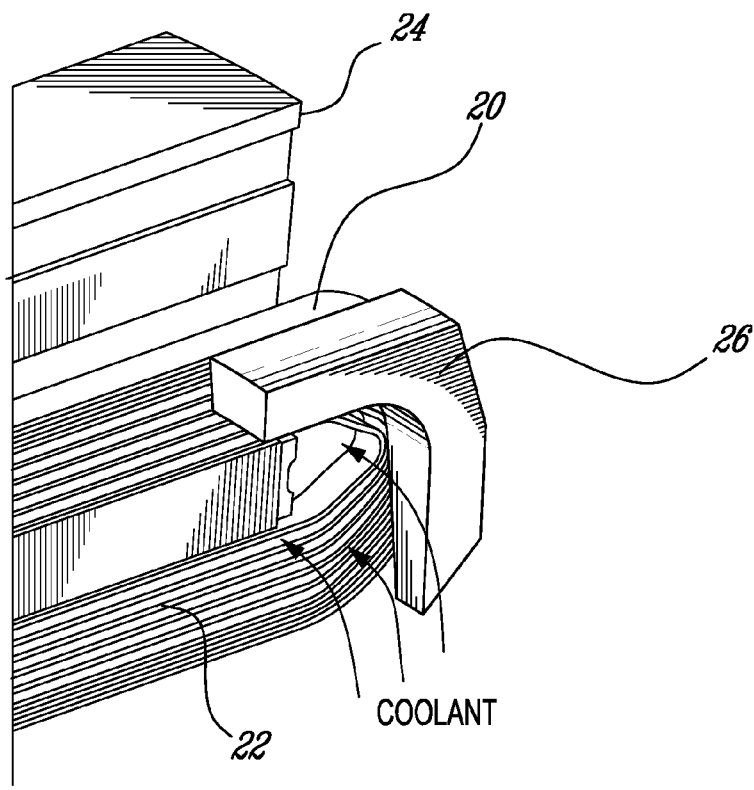
FIG. 3 is a view similar to FIG. 2, showing an example of a winding end turn with an example of a coolant splitter member of the present concept.

FIG. 3 illustrates how the coolant flows through a winding end turn 20 in the present concept (the basic configuration of winding end turn 20 in FIG. 3 is similar to that of FIG. 2). The winding end turn 20 is part of a winding 22 provided in a stator 24 of the electric machine 10. The illustrated winding 22 is a flat, ribbon like conductor, in which the various layers are very close to one another. The exterior of each layer may have an electrically insulating varnish or sheeting. This way, the layers of the winding 22 are not short-circuited in this example. Winding end turns may have conductors shaped differently than what is shown and may also have any suitable configuration, number of layers/turns, etc. It should be noted that in the figures, the space between adjacent layers in a winding end turn 20 has been exaggerated for the purpose of illustration.

FIG. 3 shows a coolant splitter 26 provided on the side of the winding end turn 20. The coolant splitter 26 redirects the flow of coolant, coming from the bottom of the figure in this example, through the illustrated winding end turn 20, which includes the gaps and also a center opening between the innermost layer and the stator 24. The coolant splitter 26 is inserted between two adjacent winding end turns 20. The second winding end turn of the pair is not shown in FIG. 3.

Figure 4:
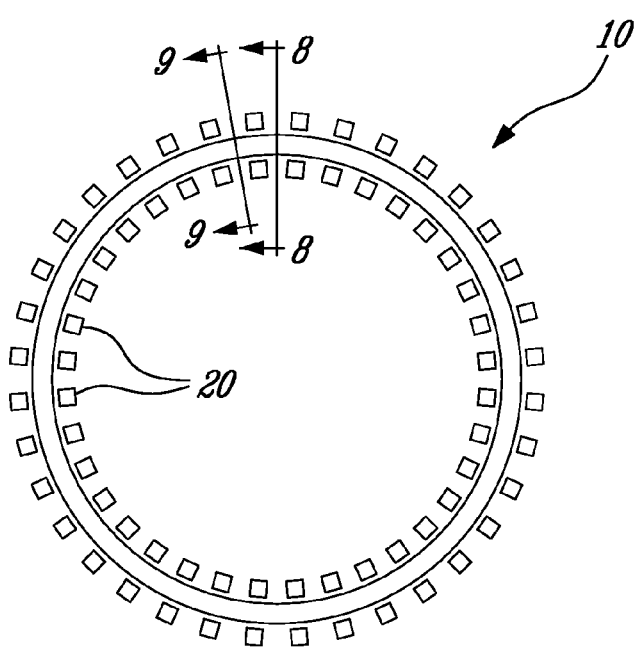
FIG. 4 is a schematic cross sectional view showing an example of axisymmetric windings of an electric machine.

FIG. 4 schematically illustrates an example of an electric machine 10 having a plurality of axisymmetric winding end turns 20. This figure shows that each winding end turn 20 is located between two other adjacent winding end turns 20.

Figure 5:
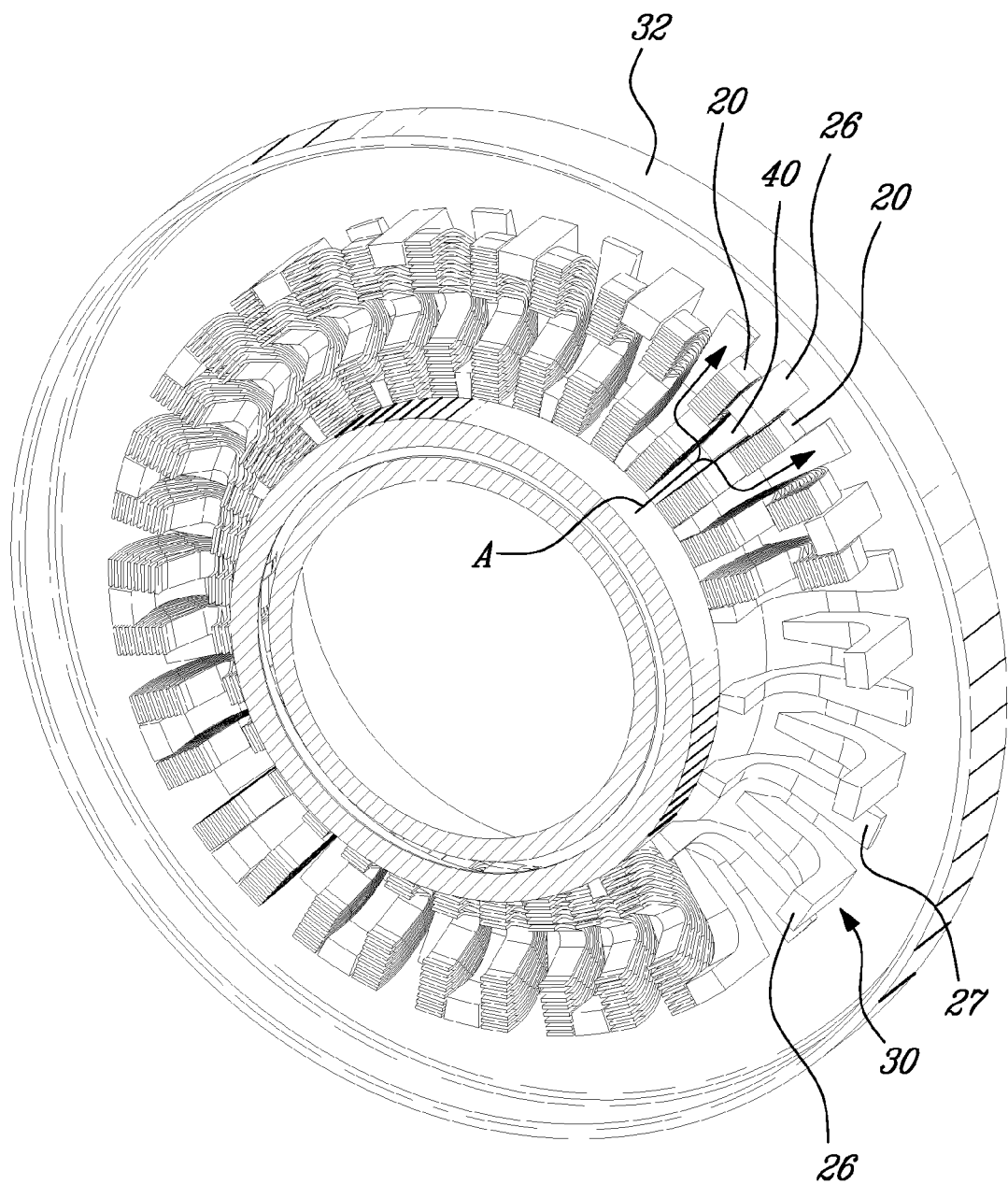
FIG. 5 is an isometric view of an example of a coolant splitter of the present concept, the coolant splitter being provided inside a casing and shown with winding end turns in cross section, some of the winding end turns being absent on a right side of the figure to show details of the coolant splitter members.

FIG. 5 illustrates an example of a coolant splitter 30 that is provided within a casing 32 fitting over the end of the stator 24 of the electric machine 10. The casing 32 is configured and disposed to prevent the coolant inside the cooling circuit from leaking out.

The illustrated coolant splitter 30 comprises a plurality of the coolant splitters 26, each preventing the coolant from flowing outward between individual pairs of winding end turns 20. Furthermore, a second coolant splitter 27 is provided between each of these pairs of the winding end turns 20. The second coolant splitters 27 have a somewhat inverted orientation with reference to the first coolant splitters 26. Both have a portion that is somewhat parallel to the bottom of the casing 32.

Each of the first coolant splitters 26 has a second portion that is projecting substantially perpendicularly, with reference to the first portion thereof, at a first radial distance with reference to the center of the machine 10. Similarly, each of the second coolant splitters 27 also have another portion that is that is projecting substantially perpendicularly, with reference to the first portion thereof, but at a second radial distance that is smaller than the first radial distance. The first coolant splitters 26 are thus referred to as the outer coolant splitters 26 and the second coolant splitters 27 are thus referred to as the inner coolant splitters 27. The outer and inner coolant splitters 26, 27 of the coolant splitter 30 are disposed in an axisymmetric manner with reference to the center of the electric machine 10.

As can be seen, the outer coolant splitters 26 and the inner coolant splitters 27 are, in this example, circumferentially disposed in an alternating fashion so that an outer 26 is provided on the outer periphery between every two winding end turns 20. Likewise, an inner 27 is provided on the outer periphery between every two winding end turns 20. This staggered configuration is repeated all around the circumference of the splitter 30.

The double arrow A in FIG. 5 shows an example of a local coolant flow between two adjacent winding end turns 20. The coolant can be supplied from an annular inner chamber (not shown in FIG. 5) communicating with a source of coolant. The coolant then enters an interspace 40 between the two adjacent winding end turns 20. However, because the local coolant flow path is blocked by the outer coolant splitter 26, one half of the coolant goes through the winding end turn 20 at the right and the other half goes to the winding end turn 20 at the left. The coolant thus flows tangentially through the winding end turns 20. This internal path is considered to be "tangential" since it is a substantially perpendicular to a center of the electric machine.

It should be noted that spacers or other items may prevent the coolant from flowing in the axial direction of the stator 24, i.e. through the axial slot or slots in which the windings 22 are provided. Depending on the design, some coolant may be able to flow within the axial slot or slots but since most of the space is occupied, this can be considered as negligible.

Figure 6:
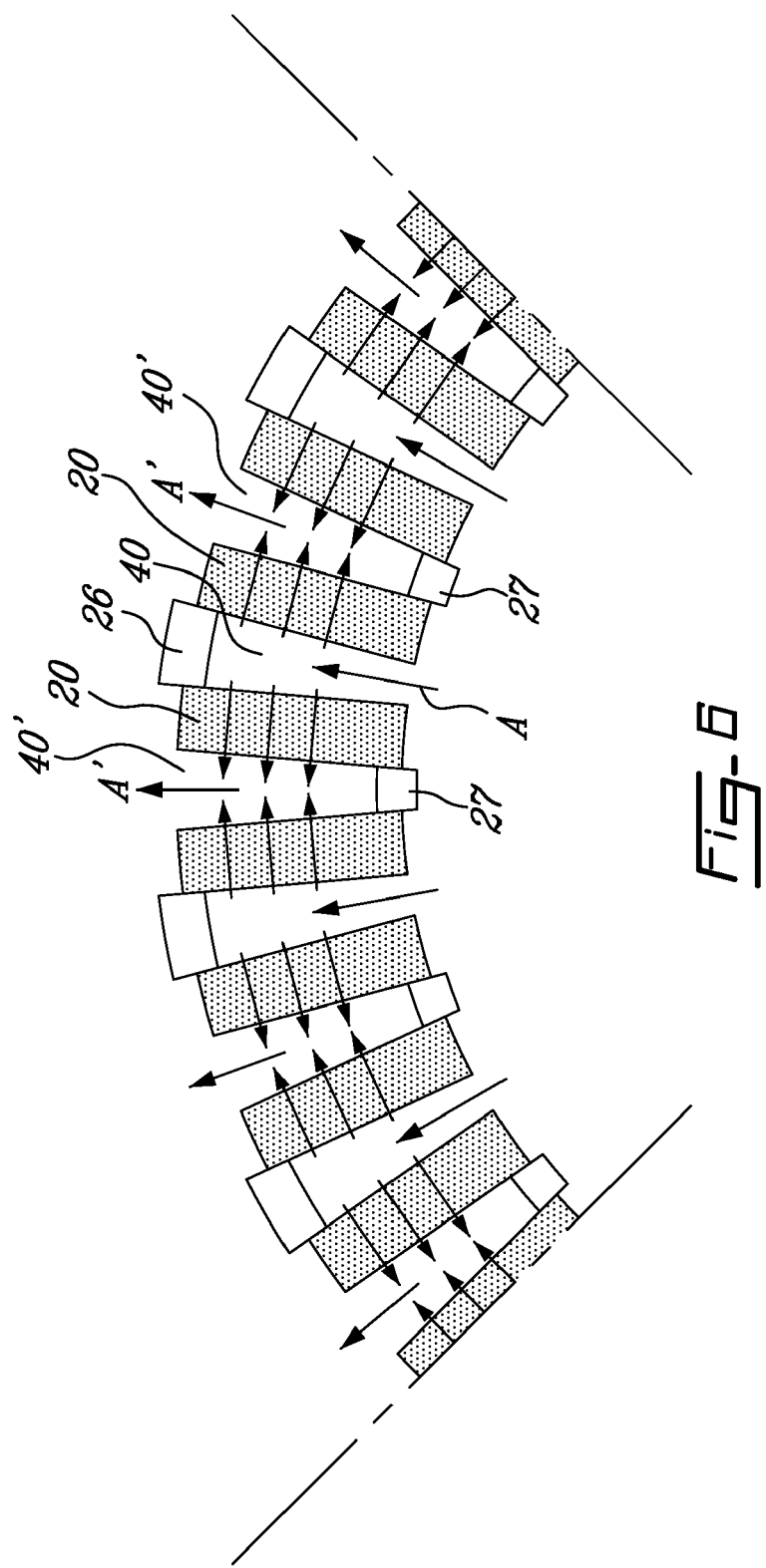
FIG. 6 is an enlarged schematic view illustrating the flow of coolant through the winding end turns using the coolant splitter of FIG. 5.

FIG. 6 schematically shows, in the radial plane of the machine, the coolant flow through the winding end turns of FIG. 5. The multiple arrows shows the flow of coolant at various locations, arrow A being one example thereof. The coolant flows radially outward, as shown. However, the presence of the coolant splitters 26 prevent the coolant from flowing radially outwards of the interspace 40 between two adjacent winding end turns 20. As a result, one half of the flow depicted using arrow A goes to the left and one half goes to the right, thereby creating the tangential flow. Once the coolant is in the interspaces 40' on the other side of the winding end turns 20, the coolant is prevented from going back toward the radially inner side of the machine 10 by the inner coolant splitters 27. The coolant then continues radially outward, as depicted by the arrows A'.

Figure 7:
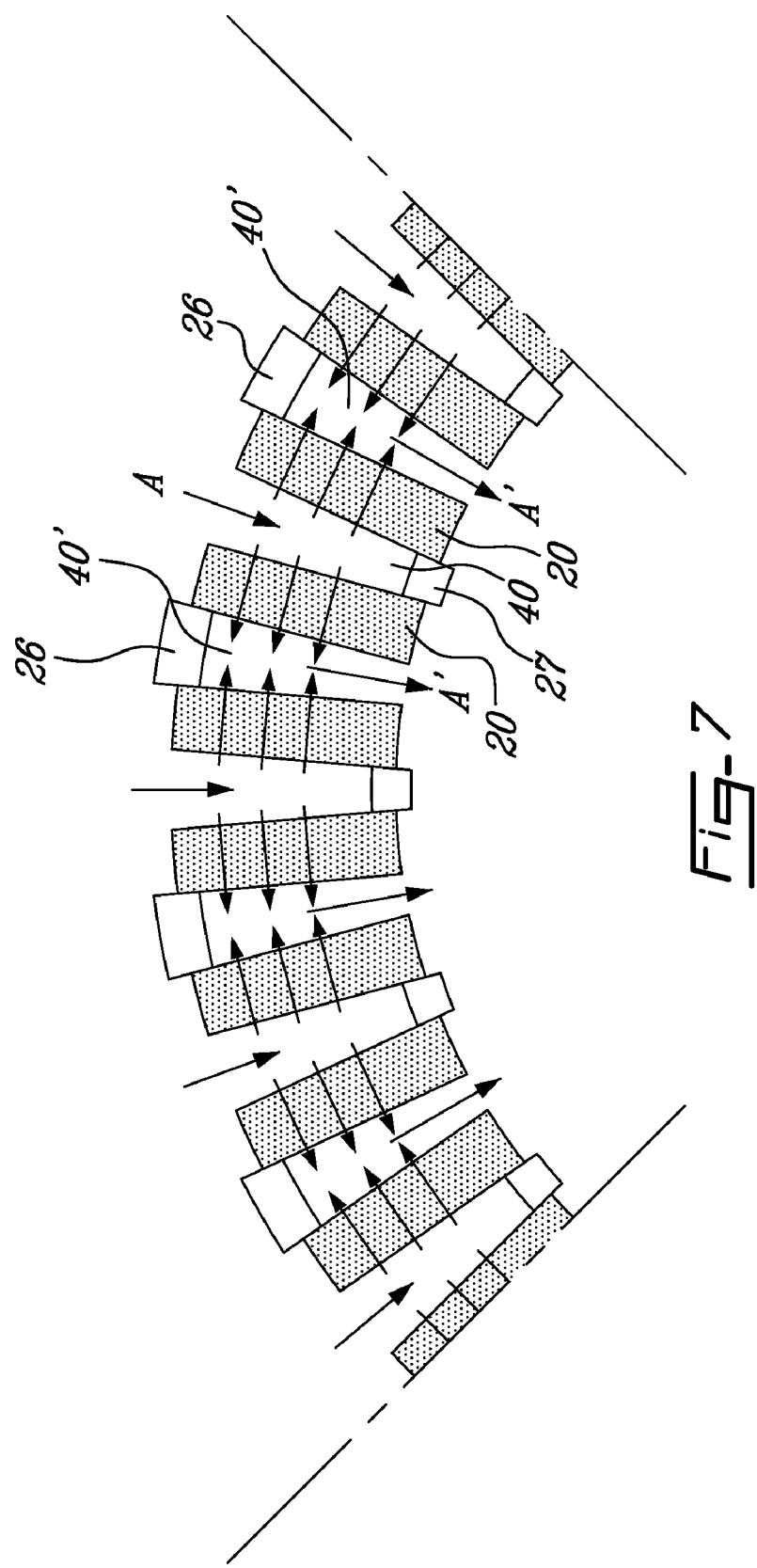
FIG. 7 is a view similar to FIG. 6, illustrating the flow of coolant through winding end turns if the coolant would have flown radially inwards.

FIG. 7 is essentially similar to FIG. 6, with the exception that the coolant flow is in the other radial direction, i.e. from an annular outer chamber towards the center of the machine. This figure may correspond, for instance, to the situation at the other end of the stator 24 in the present example. In FIG. 7, the coolant from arrow A flows radially inwards, as shown. However, the presence of the inner splitter 27 prevent the coolant from flowing radially inwards out the interspace 40 between the two adjacent winding end turns 20. As a result, one half of the flow depicted using arrow A goes to the left and one half goes to the right, thereby creating a tangential flow through winding end turns 20. Once the coolant is in the interspaces 40' on the other side of the winding end turns 20, the coolant is prevented from going back toward the radially outer side of the machine 10 by the outer coolant splitters 26. The coolant then continues radially inward, as depicted by the arrows A'.

Figure 8:
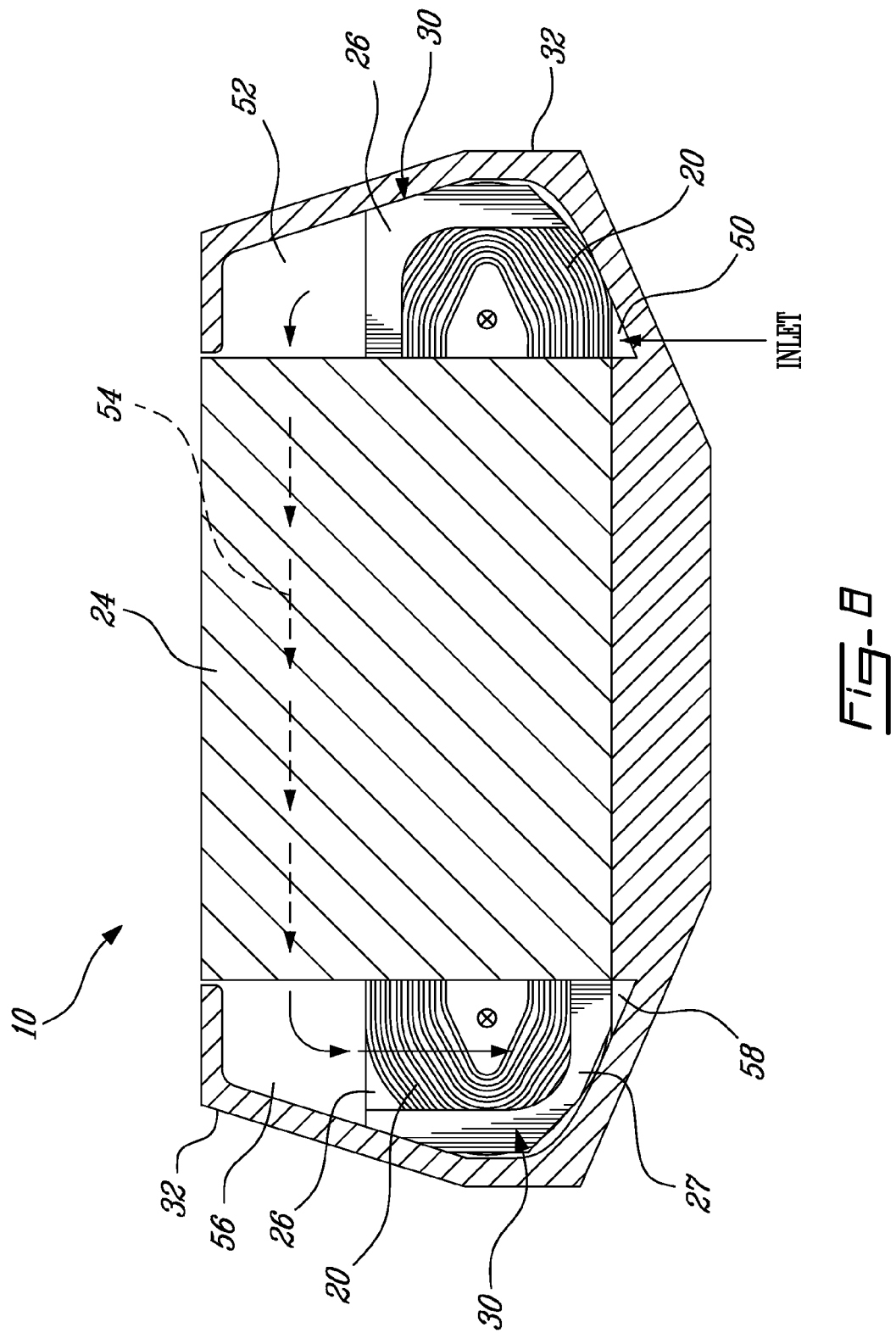
FIG. 8 is a cross-sectional view of an example of an electric machine using the present concept, which view is oriented as shown with line 8-8 in FIG. 4.
Figure 9:
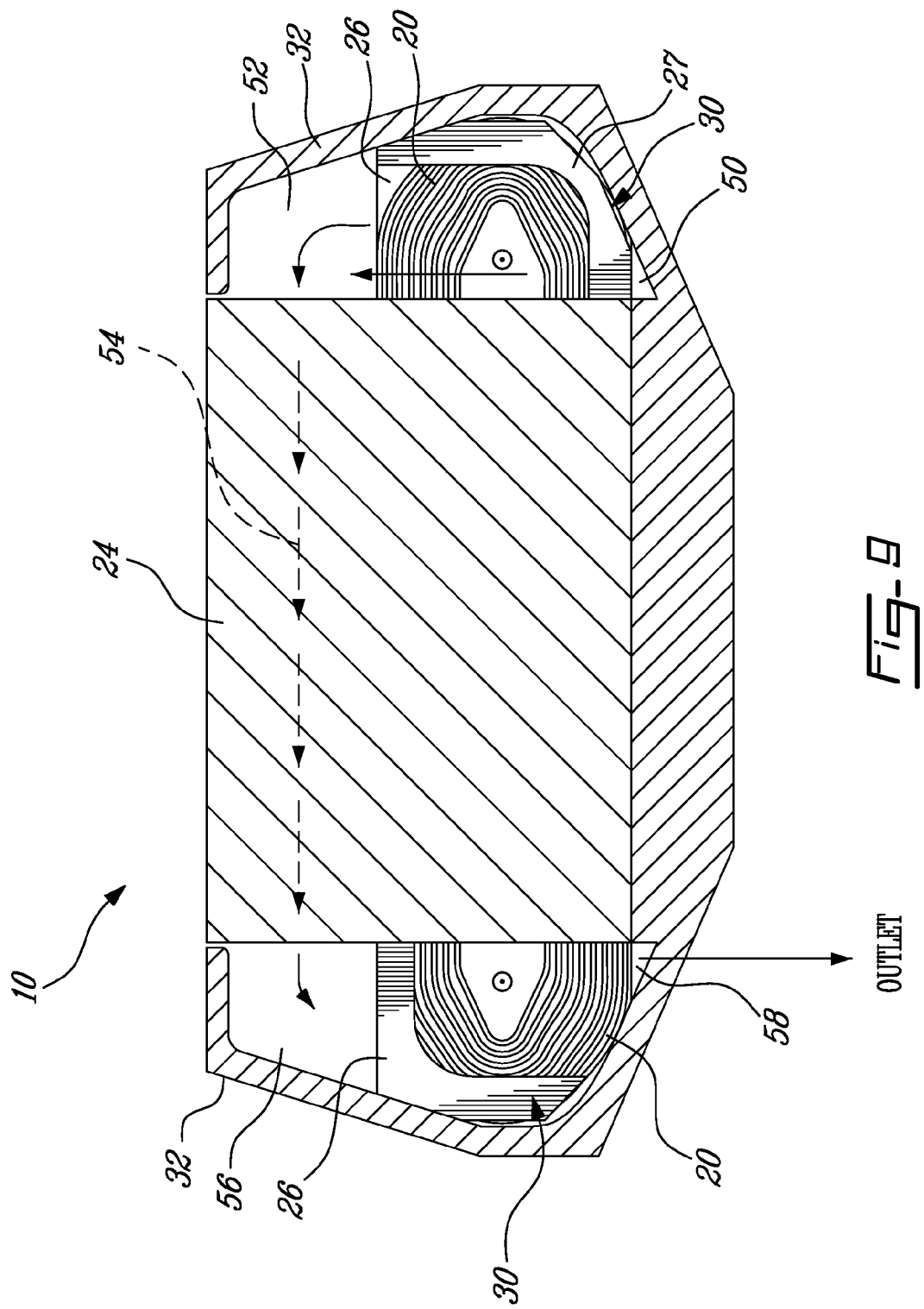
FIG. 9 is a view similar to FIG. 8, which view is oriented as shown with line 9-9 of FIG. 4 and illustrates the flow of coolant at a position that is circumferentially adjacent to what is shown in FIG. 8.

FIGS. 8 and 9 show an example of the resulting assembly in the machine 10 and the flow of coolant at two immediately circumferentially adjacent positions. These two positions are depicted in FIG. 4. FIGS. 8 and 9 schematically show the core of the stator 24, the winding end turns 20 and the covers 32 in which are provided corresponding coolant splitters 30.

In FIG. 8, the coolant first enters in an annular channel 50 located on the inner side of the machine 10. It should be noted that the coolant does not necessarily enters the annular channel 50 only at one inlet. The coolant may enter, for instance coming from an external pump 16 as shown in FIG. 1, using a plurality of inlets. Also, the annular channel 50 can be segmented in independent sections, each on having its inlet. From the channel 50, the coolant goes between each separate pair of adjacent winding end turns 20, as shown for instance in FIG. 5. The coolant enters in the interspaces where the outer splitters 26 are located. However, because the coolant is blocked by the outer splitters 26, the coolant is forced to flow through the winding end turns 20. In FIG. 8, the coolant enters the interspace between two adjacent winding end turns 20 one half flows at the right and one half flows through the one that is illustrated, after which is continues into an annular outer chamber 52. Depending on the design of the electric machine, the chamber 52 can be common to only one pair or to more than one pair of winding end turns. The general direction of the flow is shown in FIG. 8 with the "into the page" symbol. From there, the coolant is channeled to another location in the machine 10, in this case to the opposite side. It is also possible to send the coolant back to the heat exchanger from that point. However, in the illustrated example, the coolant enters an axially-extending channel 54, schematically shown in FIGS. 8 and 9, that is provided through the stator 24. The coolant is sent to another annular outer chamber 56, similar to the chamber 52. The coolant cannot flow radially inward at half of the interspaces between the winding end turns 20 at the left side in FIG. 8 because of the outer splitters 26. The coolant enters through half of the interspaces. One half of the coolant goes through the illustrated winding end turn 20 (as indicated by the "into the page" symbol), the other half going to the adjacent winding end turn (not shown), and reaches an annular inner chamber 58 forming the coolant outlet in the depicted example.

Although not depicted in the Figures, preferably the machine 10 includes a plurality of coolant inlets communicating with the pump 16 and a plurality of coolant outlets communicating with the heat exchanger 14, thereby providing a number of fluidly parallel coolant circuits through the various winding end turns 20 of the machine 10.

FIG. 9 is similar to FIG. 8 and illustrates the situation at a position that is immediately adjacent to that of FIG. 8. The "out of the page" symbols are used since the coolant flow from that direction if FIG. 9.

It should be noted that the opposite sides of the machine 10 do not necessarily need to be identical. It is also possible to use external tubes or pipes to convey the coolant in the axial direction. Still, the coolant splitters 30 can be aligned with each other, this being different from what is shown in FIGS. 8 and 9.

There is also provided a method of circulating coolant through an electric machine which preferably includes the steps of (a) providing the coolant into a first set of interspaces separating winding end turns located in the electric machine; (b) dividing in two the coolant circulating in the first set of interspaces, each half of the coolant being circulated through a corresponding one of the winding end turns; and (c) receiving the coolant coming out of two adjacent of the winding end turns from a second set of the interspaces separating the two adjacent winding end turns.

The above description is meant to be exemplary only, and one skilled in the art will recognize that changes may be made to the embodiments described without departing from the scope of the invention disclosed. For example, although a machine having a plurality of winding layers is shown, this is not required. Any suitable winding shape, configuration, and material may be employed. The shape and configuration of the splitter device can be any suitable, and need not be the same as that described and shown in the figures. The flow of the coolant may be segmented in independent machine sectors, each having a different flow direction, or may be arranged serially between sectors. The coolant can be used only once through the machine before being discarded. The coolant is not necessarily oil or a liquid. The source of coolant and associated elements can be located within the electric machine, and thus not be at the exterior thereof. The coolant can be used at more than two areas or locations of the electric machine before being sent to the heat exchanger or be discarded. Still other modifications which fall within the scope of the present invention will be apparent to those skilled in the art, in light of a review of this disclosure, and such modifications are intended to fall within the appended claims.

What is claimed is:

1. An electric machine comprising:
   a stator;
   a plurality of winding end turns that are mounted to the stator and are generally axisymmetric with respect to one another, with interspaces between pairs of adjacent winding end turns, the winding end turns each defined by layers of winding, with spaces between the layers of each said winding end turn tangentially oriented relative to the machine, the spaces of each of the winding end turns communicating with the interspaces on opposite side of the winding end turn;
   a plurality of coolant input paths, each communicating with a source of coolant and each defined in one of the interspaces extending radially relative to a center of the electric machine and between a corresponding pair of the winding end turns;
   a plurality of internal coolant paths defined tangentially relative to the machine, each internal coolant path substantially extending at least through said spaces defined between the layers of a corresponding one of the winding end turns and communicating with a corresponding one of the coolant input paths; and
   a plurality of coolant output paths, each communicating with a corresponding pair of the internal coolant paths.

2. The electric machine as defined in claim 1, wherein the coolant input paths and the coolant output paths are generally radially extending with reference to a center of the machine.

3. The electric machine as defined in claim 1, wherein the source of coolant includes an external coolant supply.

4. The electric machine as defined in claim 3, wherein the coolant is a liquid.

5. The electric machine as defined in claim 1, wherein the coolant from at least some of the coolant output paths is sent to a second area of the machine for cooling a second set of winding end turns, the electric machine having second internal coolant paths through the winding end turns of the second area.

6. The electric machine as defined in claim 1, wherein the electric machine comprises a plurality of coolant guides located between the winding end turns.

7. The electric machine as defined in claim 6, wherein the coolant guides include first and second guides alternately disposed in the interspace between the winding end turns and projecting axially with reference to a central axis of the machine, each first coolant guide located at an end of a corresponding one of the coolant input paths, and each second coolant guide located at a beginning a corresponding one of the coolant output paths.

8. The electric machine as defined in claim 7, wherein coolant guides are provided within a cover sealingly engaged against the machine and enclosing the winding end turns.

9. An electric machine comprising:
   a stator;
   a plurality of winding end turns mounted to the stator and being generally axisymmetric with respect to one another, with interspaces between pairs of adjacent winding end turns, the winding end turns each defined by layers of winding, with spaces between the layers of each said winding end turn tangentially oriented relative to the machine, the spaces of each of the winding end turns communicating with the interspaces on opposite side of the winding end turn;
   means for distributing coolant between pairs of adjacently-disposed winding end turns formed by the winding end turns of the machine;

means for directing the coolant from between the pairs of winding end turns tangentially relative to a center of the machine through spaces defined between layers of the corresponding winding end turns of each pair; and means for redirecting the tangential flow of coolant exiting the winding end turns to an outlet.

10. The electric machine as defined in claim 9, wherein the means for distributing the coolant includes means for supplying the coolant from an external coolant supply.

11. The electric machine as defined in claim 10, wherein the means for directing the coolant include a splitter having guides interposed between the winding end turns.

12. The electric machine as defined in claim 10, further comprising means for sending the coolant to other winding end turns located in another area of the machine.

* * * * *